(12) United States Patent
Lv et al.

(10) Patent No.: US 12,223,424 B2
(45) Date of Patent: Feb. 11, 2025

(54) METHOD FOR DIFFERENTIABLE ARCHITECTURE SEARCH BASED ON A HIERARCHICAL GROUPING MECHANISM

(71) Applicant: Sichuan University, Chengdu (CN)

(72) Inventors: Jiancheng Lv, Chengdu (CN); Chuan Liu, Chengdu (CN); Qing Ye, Chengdu (CN); Yanan Sun, Chengdu (CN); Zhenan He, Chengdu (CN)

(73) Assignee: Sichuan University, Chengdu (CN)

( * ) Notice: Subject to any disclaimer, the term of this patent is extended or adjusted under 35 U.S.C. 154(b) by 1062 days.

(21) Appl. No.: 17/151,222

(22) Filed: Jan. 18, 2021

(65) Prior Publication Data

US 2021/0224650 A1  Jul. 22, 2021

(30) Foreign Application Priority Data

Jan. 17, 2020 (CN) .......................... 202010055469.0

(51) Int. Cl.
*G06N 3/08* (2023.01)
*G06F 16/901* (2019.01)
*G06F 16/906* (2019.01)

(52) U.S. Cl.
CPC ........... *G06N 3/08* (2013.01); *G06F 16/9024* (2019.01); *G06F 16/9027* (2019.01); *G06F 16/906* (2019.01)

(58) Field of Classification Search
CPC ..... G06N 3/08; G06F 16/906; G06F 16/9027; G06F 16/9024
See application file for complete search history.

(56) References Cited

U.S. PATENT DOCUMENTS

| | | | |
|---|---|---|---|
| 2021/0056378 A1* | 2/2021 | Yang | G06F 16/9024 |
| 2021/0383223 A1* | 12/2021 | Tan | G06N 3/084 |
| 2022/0215227 A1* | 7/2022 | Li | G06F 18/00 |

OTHER PUBLICATIONS

Elsken, Thomas, Jan Hendrik Metzen, and Frank Hutter. "Neural architecture search: A survey." Journal of Machine Learning Research 20.55 (2019): 1-21. (Year: 2019).*

(Continued)

*Primary Examiner* — Andrew T Chiusano
(74) *Attorney, Agent, or Firm* — Bayramoglu Law Offices LLC

(57) ABSTRACT

A method for differentiable architecture search based on a hierarchical grouping mechanism includes: obtaining a target dataset; selecting a set number of normal cells and two reduction cells; enabling the reduction cells to be located at ⅓ and ⅔ of all cells, respectively, and then concatenating all cells to form an initial search network; training the initial search network to optimize a cost function to complete a one-level search or a two-level search, wherein in the one-level search, control weight parameters are shared by the inter-group operations and are shared by the intra-group operations among the cells; and in the two-level search, the control weight parameters are shared by the inter-group operations and are not shared by the intra-group operations, obtaining normal cells and reduction cells based on the one-level search or the two-level search; and constructing a target network using the normal cells and the reduction cells.

8 Claims, 2 Drawing Sheets

(56) References Cited

OTHER PUBLICATIONS

Pham, Hieu, et al. "Efficient neural architecture search via parameters sharing." International conference on machine learning. PMLR, 2018. (Year: 2018).*

Liu, Hanxiao, Karen Simonyan, and Yiming Yang. "Darts: Differentiable architecture search." arXiv preprint arXiv: 1806.09055 (2018). (Year: 2018).*

Hong, Hyeong Gwon, Pyunghwan Ahn, and Junmo Kim. "Edas: Efficient and differentiable architecture search." arXiv preprint arXiv:1912.01237 (2019). (Year: 2019).*

Jin, Xiaojie, et al. "Rc-darts: Resource constrained differentiable architecture search." arXiv preprint arXiv: 1912.12814 (2019). (Year 2019).*

Stamoulis, Dimitrios, et al. "Single-path nas: Designing hardware-efficient convnets in less than 4 hours." Joint European Conference on Machine Learning and Knowledge Discovery in Databases. Cham: Springer International Publishing, 2019. (Year: 2019).*

Guilin, Li, et al. "StacNAS: Towards stable and consistent optimization for differentiable neural architecture search." (2019). (Year: 2019).*

Liang, Hanwen, et al. "Darts+: Improved differentiable architecture search with early stopping." arXiv preprint arXiv:1909.06035 (2019). (Year: 2019).*

\* cited by examiner

METHOD FOR DIFFERENTIABLE ARCHITECTURE SEARCH BASED ON A HIERARCHICAL GROUPING MECHANISM

CROSS REFERENCE TO THE RELATED APPLICATIONS

This application is based upon and claims priority to Chinese Patent Application No. 202010055469.0, filed on Jan. 17, 2020, the entire contents of which are incorporated herein by reference.

TECHNICAL FIELD

The present invention relates to the field of neural network search construction, and more particularly, to a method for differentiable architecture search based on a hierarchical grouping mechanism.

BACKGROUND

The paper titled "DARTS: Differentiable Architecture Search" proposes a gradient-based algorithm with deep learning for differentiable architecture search. This technique greatly saves computing time and resources compared with reinforcement learning and evolutionary algorithms. The algorithm relaxes the discrete search space into a continuous search space, and performs network searches via the technique of gradient backpropagation. Although this algorithm solves some problems encountered in the neural network architecture search, operations in the search space defined by this algorithm have multicollinearity, which results in an unreasonable distribution of weights of edges during the search process. Many experiments have shown, skip-connect operations will accumulate relatively large weights at the beginning. As a result, the searched network cells are almost all skip-connect operations when DARTS has a large number of training epochs. Moreover, although DARTS has greatly reduced the search time of the model, it remains to be improved. Additionally, the network architecture searched by DARTS is not identical to the network finally constructed. In this case, the search results may be satisfactory, but cannot achieve the desired effect during actual use.

Another paper titled "STACNAS: Stable and Consistent Differentiable Neural Architecture Search" proposes an improved differentiable architecture search algorithm with deep learning, and has attempted to solve the problems in DARTS. In this paper, correlations of operations are calculated, and the correlations are grouped in the search process. Then, the original search algorithm is divided into two steps. In the first step, operations from different groups are selected through the first-stage search. In the second step, all operations of the selected groups are activated to perform the second-stage search. The search process of the first stage and the second stage is similar to a pruning process, which enables this technique to perform direct searches on relatively large datasets. Therefore, this algorithm can select the optimal operations more stably and accurately than the DARTS algorithm. However, in first-stage, if only one operation is selected to represent the group operation, there may be some gap.

SUMMARY

In view of the above-mentioned shortcomings in the prior art, the present invention provides a method for differentiable architecture search based on a hierarchical grouping mechanism, which tries to solve the problem of multicollinearity of the DARTS algorithm and the gap in first-stage caused by the phased STACNAS algorithm.

In order to achieve the above-mentioned objective of the present invention, the present invention adopts the following technical solutions.

The present invention provides a method for differentiable architecture search based on a hierarchical grouping mechanism, including:

S1: obtaining a target dataset to be subjected to a network architecture search;

S2: selecting a set number of normal cells and 2 reduction cells, wherein operations of each cell of the set number of normal cells and 2 reduction cells form a directed acyclic graph; enabling the reduction cells to be located at the positions numbered by rounding down ⅓ and ⅔ of all cells, respectively, and then concatenating all cells to form an initial search network; wherein the edges of the directed acyclic graph of each cell of the normal cells and the reduction cells are all formed by mixing a plurality of inter-group operations, and the inter-group operation is formed by mixing a plurality of intra-group operations;

S3: using training samples in the target dataset as an input of the initial search network, training the initial search network to optimize a cost function to complete a one-level search or a two-level search, wherein in the one-level search, control weight parameters are shared by the inter-group operations and are shared by the intra-group operations among the cells; and in the two-level search, the control weight parameters are shared by the inter-group operations and are not shared by the intra-group operations among the cells, obtaining normal cells and reduction cells based on the one-level search or the two-level search;

S4: constructing a target network using the normal cells and the reduction cells obtained from the one-level search or the two-level search by the following steps:

S41: in case of the two-level search, constructing a training network in the form of the target network using the normal cells and the reduction cells obtained from the two-level search according to the target dataset, iteratively training the network until a preset number of iterations is reached to obtain the order of control weight parameters of the intra-group operations of each cell, and deleting an intra-group operation corresponding to a smallest control weight parameter to obtain the target network; and S42: in case of the one-level search, constructing the target network with the number of cells of the target network using the normal cells and the reduction cells obtained from the one-level search.

The advantages of the present invention are as follows. The search method provided by the present invention improves the correlation of operations in the search space of DARTS, and achieves a certain regularization effect. Compared with STACNAS, the one-level search simplifies the search process and does not require a hierarchical search. The two-level search enables inter-group operations to be selected based on the architecture actually constructed, thereby alleviating, to a certain extent, the effectiveness gap between the searched architecture and the actually used architecture.

DETAILED DESCRIPTION OF THE EMBODIMENTS

The specific embodiments of the present invention are described below to help those skilled in the art understand the present invention. However, it should be noted that the present invention is not limited to the scope of the specific embodiments. For those of ordinary skill in the art, as long as various changes fall within the spirit and scope of the present invention defined by the appended claims, these changes are obvious, and all inventions and creations using the concept of the present invention shall fall within the scope of protection of the present invention.

Figure 1:
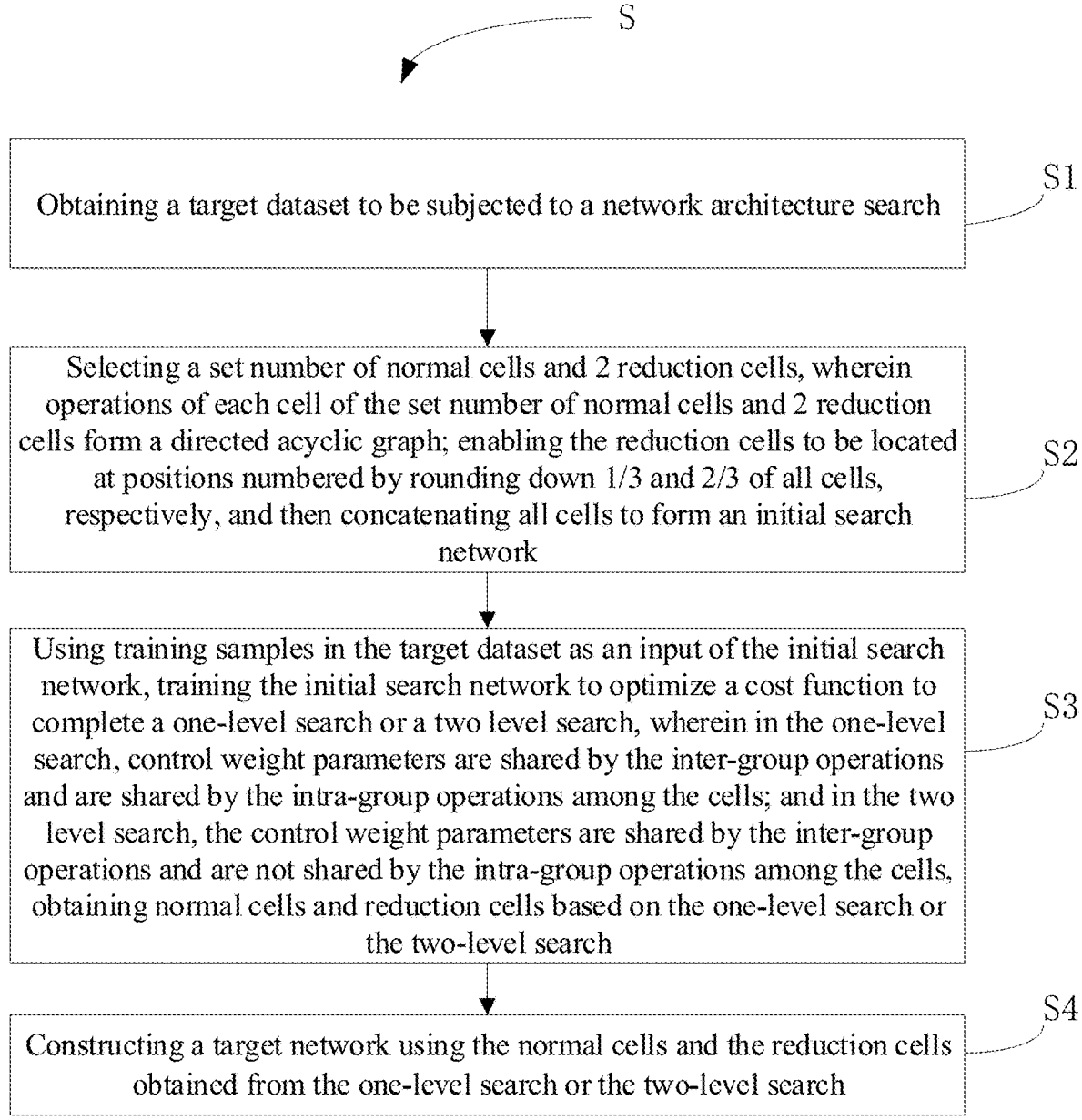
FIG. 1 is a flow chart of a method for differentiable architecture search based on a hierarchical grouping mechanism.

Referring to FIG. 1, FIG. 1 shows a flow chart of a method for differentiable architecture search based on a hierarchical grouping mechanism. As shown in FIG. 1, the method S includes steps S1 to S4.

Step S1: a target dataset to be subjected to a network architecture search is obtained, wherein the target dataset may be CIFAR10, CIFAR100, ImageNet, and so on.

Step S2: a set number of normal cells and 2 reduction cells are selected, and operations of each cell of the set number of normal cells and 2 reduction cells form a directed acyclic graph. The reduction cells are enabled to be located at the positions numbered by rounding down ⅓ and ⅔ of all cells, respectively, and then all cells are concatenated to form an initial search network.

The edges of the directed acyclic graph of each cell of the normal cells and the reduction cells are all formed by mixing a plurality of inter-group operations, and the inter-group operation is formed by mixing a plurality of intra-group operations.

When the initial search network is constructed, the number of normal cells can be selected as needed. In the present invention, 6 normal cells are preferably selected, and thus there are 8 cells in total. Among the 8 cells, the 2 reduction cells are located at the $2^{nd}$ position and the $5^{th}$ position, respectively. The directed acyclic graph of each cell (the term "cell", when used alone, includes both the normal cell and the reduction cell) in the initial state is an extremely dense directed acyclic graph. The dense directed acyclic graph includes various connections, and each edge includes all inter-group operations and intra-group operations. The directed acyclic graph of each cell in the initial state is known.

The main difference between the reduction cell and the normal cell in the present invention is as follows: the reduction cell reduces the image size by a factor of 2, while the normal cell does not change the image size. The inter-group operations are zero operations ('none'), a separable convolution group ('Sw_Sep'), a dilated convolution group ('Sw_Dil'), skip-connect ('skip_connect') or a pooling group ('Sw_Pool'). The intra-group operations are convolutions and pooling.

During implementation, according to the present invention, preferably, a calculation formula for mixing the plurality of inter-group operations to form the edges of the directed acyclic graph or mixing the plurality of intra-group operations is:

$$\bar{o}^{(i,j)}(x) = \sum_{o \in O} \frac{\exp\left(\alpha_o^{(i,j)}\right)}{\sum_{o' \in O} \exp\left(\alpha_{o'}^{(i,j)}\right)} o(x);$$

wherein, O represents a set of inter-group operations/intra-group operations in the normal cell/reduction cell; o(•) represents an inter-group operation/intra-group operation used for x; x represents the inter-group operation/intra-group operation; o' and o both represent elements in the set O; $\alpha_{o'}^{(i,j)}$ represents a vector with a dimension of |O|; (i, j) represents nodes used for mixing weights by parameterized operation; and $\bar{o}^{(i,j)}(x)$ represents a mixed operation of o(x).

The separable convolution group includes 3×3 separable convolutions ('sep_conv_3×3') and 5×5 separable convolutions ('sep_conv_5×5'). The dilated convolution group includes 3×3 dilated convolutions ('dil_conv_3×3') and 5×5 dilated convolutions ('dil_conv_5×5'). The pooling group includes 3×3 max pooling ('max_pool_3×3') and 3×3 average pooling ('avg_pool_3×3').

The 3×3 separable convolutions, the 5×5 separable convolutions, the 3×3 dilated convolutions, the 5×5 dilated convolutions, the 3×3 max pooling and the 3×3 average pooling are all basic components in a neural network.

The intra-group operations of each inter-group operation include convolutions and pooling. The inter-group operations are all formed by mixing the intra-group operations using a method that is the same as the method for forming the edges of a directed acyclic graph by mixing the inter-group operations of each cell.

Step S3: training samples in the target dataset are used as an input of the initial search network, the initial search network is trained to optimize a cost function to complete a one-level search or a two-level search, wherein in the one-level search, control weight parameters are shared by the inter-group operations and are shared by the intra-group operations among the cells; and in the two-level search, the control weight parameters are shared by the inter-group operations and are not shared by the intra-group operations among the cells; and normal cells and reduction cells are obtained based on the one-level search or the two-level search.

During implementation, according to the present invention, a calculation formula for optimizing the cost function is preferably:

$$\min_{\alpha} L_{val}(\omega^*(\alpha), \alpha);$$

$$\text{s.t. } \omega^*(\alpha) = \operatorname{argmin}_{\omega} L_{train}(\omega, \alpha);$$

wherein, $L_{train}$ represents a loss function of a training set; $L_{val}$ represents a loss function of a validation set; α represents a mixed architecture weight; and ω represents a network weight.

In an embodiment of the present invention, step S3 further includes:

after the network of the one-level search is trained, the control weight parameters of all inter-group operations in each cell are sorted in descending order. For each node in the directed acyclic graph, the top two inter-group operations from different nodes among all non-zero inter-group operations connected to all previous nodes are retained; control weight parameters of intra-group operations of the two inter-group operations retained for each cell are sorted in descending order, and an intra-group operation with the largest control weight parameter among the inter-group operations is retained; and after the network of the two-level search is trained, the control weight parameters of all inter-group operations in each cell are sorted in descending order; for each node in the directed acyclic graph, the top two inter-group operations from different nodes among all non-zero inter-group operations connected to all previous nodes are retained.

Step S3 is further described in detail as follows. The specific implementation of the one-level search is as follows. The inter-group operations are mixed in the manner of $\overline{o}^{(i,j)}(x)$ to form the edges of the directed acyclic graph, while one control weight parameter is assigned to each of the intra-group operations, and the sum of the control weight parameters of the intra-group operations is always 1. When 6 normal cells are selected, one control weight parameter is shared among the identical inter-group operations in the 6 normal cells, which means that there are a total of 6 control weight parameters of the intra-group operations in the 6 normal cells in this case. One control weight parameter is shared among the identical inter-group operations in the 2 reduction cells, which means that there are a total of 6 control weight parameters of the intra-group operations in the 2 reduction cells in this case. Then, the target dataset obtained in step S1 is input to train the network to obtain the final normal cell and reduction cell.

The specific implementation of the two-level search is as follows. The inter-group operations are mixed in the manner of $\overline{o}^{(i,j)}(x)$ to form the edges of the directed acyclic graph, while one control weight parameter is assigned to each of the intra-group operations, and the sum of the control weight parameters of the intra-group operations is always 1. The control weight parameters of the identical intra-group operations in the 8 cells are different, that is, the control weight parameters are not shared, which means that there are 6 control weight parameters of the intra-group operations in each cell in this case. Then, the target dataset obtained in step S1 is input to train the network to obtain the normal cell and the reduction cell.

Figure 2:
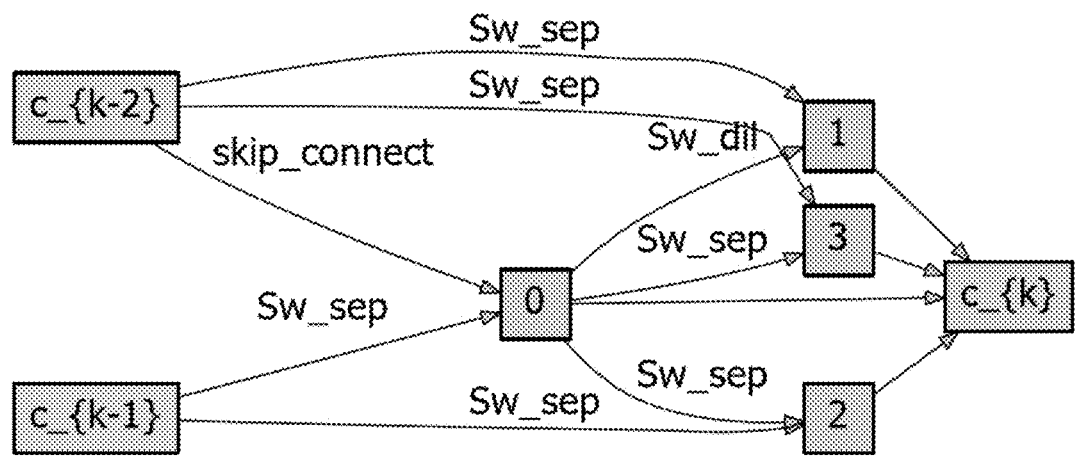
FIG. 2 shows normal cells obtained from the two-level search on the CIFAR-10 dataset.
Figure 3:
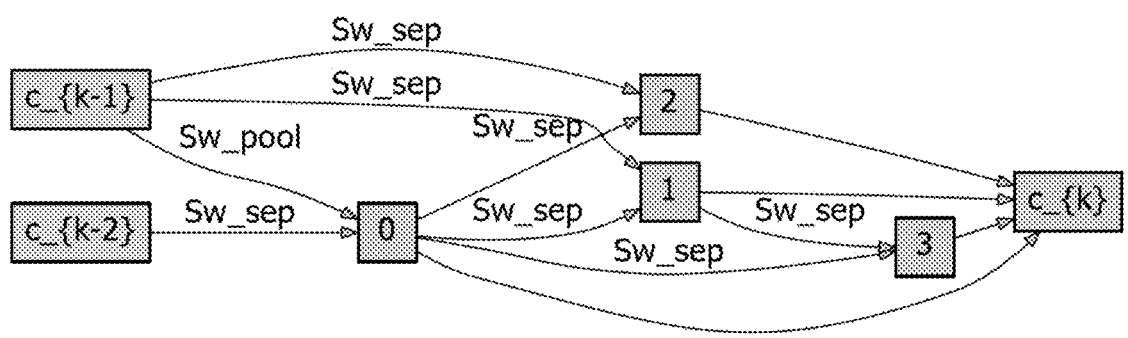
FIG. 3 shows reduction cells obtained from the two-level search on the CIFAR-10 dataset.

FIG. 2 and FIG. 3 are schematic diagrams of some intermediate results obtained from the two-level search. Whether the control weight parameters of the inter-group operations, or the control weight parameters of the intra-group operations, are optimized simultaneously with the training of the entire network. For the one-level search, after the network is trained, the control weight parameters of the inter-group operations are sorted. For each node in the directed acyclic graph, the top two operations (from different nodes) among all non-zero candidate operations connected to all the previous nodes are retained, while the remaining operation connections are considered to have little contribution to the entire network, and thus are deleted.

Similarly, the control weight parameters of the intra-group operations are sorted. For each inter-group operation connection in the directed acyclic graph, the intra-group operation with the largest control weight parameter is retained, while the remaining intra-group operation connections are deleted, so as to obtain the simplified and optimized operation connection mode.

For the two-level search, after the network is trained, the control weight parameters of the inter-group operations are sorted. For each node in the directed acyclic graph, the top two operations (from different nodes) among all non-zero candidate operations connected to all the previous nodes are retained, while the remaining operation connections are considered to have little contribution to the entire network, and thus are deleted. In this case, unlike the one-level search, the two-level search does not delete the intra-group operations. The deletion of the intra-group operations in the two-level search is performed in step S4.

Step S4: the target network is constructed by the normal cells and the reduction cells obtained from the one-level search or the two-level search through the following steps:

Step S41: in case of the two-level search, a training network is constructed in the form of the target network by using the normal cells and the reduction cells obtained from the two-level search according to the target dataset, the network is iteratively trained until a preset number of iterations is reached to obtain the order of the control weight parameters of the intra-group operations of each cell, and an intra-group operation corresponding to the smallest control weight parameter is deleted to obtain the target network.

In step S41, the target network is constructed according to the needs of the task. For example, if the task needs to construct 20 cells, then 18 normal cells and 2 reduction cells are required. The 18 normal cells are identical when the target network is constructed, and the normal cells are obtained from the two-level search in step S3. The 2 reduction cells are also identical when the target network is constructed, and the reduction cells are obtained from the two-level search in step S3. However, after step S4, the 18 normal cells and the 2 reduction cells may be different from one another.

After the network is trained, the control weight parameters of all the intra-group operations of the same inter-group operation in each cell are sorted in descending order. For each inter-group operation connection in the directed acyclic graph, the intra-group operation with the largest control weight parameter in the same inter-group operation is retained, and the remaining intra-group operation connections are considered to have little contribution to the entire network, and thus are deleted, so as to obtain the final target network.

Step S42: in case of the one-level search, the target network is constructed in the form of the target network using the normal cells and the reduction cells obtained from the one-level search.

In step S4, the two reduction cells of the constructed target network are respectively located at the positions numbered by rounding down ⅓ and ⅔ of all cells. Assuming there are 18 normal cells, then the two reduction cells among the 20 cells are located at the $6^{th}$ position and the $13^{th}$ position, respectively.

What is claimed is:

1. A method for a differentiable architecture search based on a hierarchical grouping mechanism, comprising:
    S1: obtaining a target dataset to be subjected to a network architecture search;
    S2: selecting a set number of normal cells and two reduction cells, wherein operations of each cell of the set number of normal cells and the two reduction cells form a directed acyclic graph; enabling the two reduction cells to be located at positions numbered by rounding down ⅓ and ⅔ of the set number of normal cells and the two reduction cells, respectively, and then concatenating the set number of normal cells and the two reduction cells to form an initial search network; wherein
    edges of the directed acyclic graph of each cell of the normal cells and the two reduction cells are formed by mixing a plurality of inter-group operations, and each inter-group operation of the plurality of inter-group operations is formed by mixing a plurality of intra-group operations;

the plurality of inter-group operations comprise zero operations, a separable convolution group, a dilated convolution group, skip-connect, and a pooling group; and the plurality of intra-group operations comprise convolutions and pooling:

S3: using training samples in the target dataset as an input of the initial search network, training the initial search network to optimize a cost function to complete a one-level search, wherein, control weight parameters are shared by the plurality of inter-group operations and are shared by the plurality of intra-group operations among the set number of normal cells and the two reduction cells; and obtaining normal cells and reduction cells based on the one-level search;

step S3 further comprising the initial search network of the one-level search is trained, sorting the control weight parameters of the plurality of inter-group operations in the each cell in descending order; for each node in the directed acyclic graph, retaining top two inter-group operations from different nodes among non-zero inter-group operations connected to previous nodes; sorting the control weight parameters of intra-group operations of the top two inter-group operations retained for the each cell in descending order, and retaining an intra-group operation with a largest control weight parameter among the plurality of inter-group operations;

S4: constructing a target network using the normal cells and the reduction cells obtained from the one-level searchby the following steps:

S42: constructing the target network with a number of the normal cells and the reduction cells of the target network using the normal cells and the reduction cells obtained from the one-level search;

S3: using training samples in the target dataset as an input of the initial search network, training the initial search network to optimize a cost function to complete a two-level search, wherein, the control weight parameters are shared by the plurality of inter-group operations and are not shared by the plurality of intra-group operations among the set number of normal cells and the two reduction cells, obtaining normal cells and reduction cells based on the two-level search; and S4: constructing a target network using the normal cells and the reduction cells obtained from the two-level search by the following steps:

S41: constructing a training network in a form of the target network by using the normal cells and the reduction cells obtained from the two-level search according to the target dataset, iteratively training the initial search network until a preset number of iterations is reached to obtain an order of the control weight parameters of the plurality of intra-group operations of the each cell, and deleting an intra-group operation corresponding to a smallest control weight parameter to obtain the target network.

2. The method according to claim 1, wherein a calculation formula for mixing the plurality of inter-group operations to form the edges of the directed acyclic graph or mixing the plurality of intra-group operations is:

$$\bar{o}^{(i,j)}(x) = \sum_{o \in O} \frac{\exp(\alpha_o^{(i,j)})}{\sum_{o' \in O} \exp(\alpha_{o'}^{(i,j)})} o(x);$$

wherein, O represents a set of the plurality of inter-group operations or the plurality of intra-group operations in the each cell; o(•) represents an inter-group operation/intra-group operation used for x; x represents the inter-group operation/intra-group operation; o' and o both represent elements in the set O; $\alpha_o^{(i,j)}$ represents a vector with a dimension of |O|; (i, j) represents nodes used for mixing weights by parameterized operation; and $\bar{o}^{(i,j)}(x)$ represents a mixed operation of o(x).

3. The method according to claim 2, wherein a calculation formula for optimizing the cost function is:

$$\min_\alpha L_{val}(\omega^*(\alpha), \alpha);$$

$$\text{s.t. } \omega^*(\alpha) = \text{argmin}_\omega L_{train}(\omega, \alpha);$$

wherein, $L_{train}$ represents a loss function of a training set; $L_{val}$ represents a loss function of a validation set; a represents a mixed architecture weight; and ω represents a network weight.

4. The method according to claim 3, wherein step S3 further comprises:

after the initial search network of the two-level search is trained, sorting the control weight parameters of the plurality of inter-group operations in the each cell in descending order; for the each node in the directed acyclic graph, retaining the top two inter-group operations from the different nodes among the non-zero inter-group operations connected to the previous nodes.

5. The method according to claim 4, wherein in step S41, when the target network is obtained by training the initial search network, after the initial search network is trained, the control weight parameters of the plurality of intra-group operations of the each inter-group operation in the each cell are sorted in descending order; for each inter-group operation connection in the directed acyclic graph, the intra-group operation with the largest control weight parameter in the each inter-group operation is retained to obtain the target network.

6. The method according to claim 2, wherein each reduction cell of the two reduction cells reduces an image size by a factor of 2, and each normal cell of the set number of normal cells does not change the image size;

the separable convolution group comprises 3×3 separable convolutions and 5×5 separable convolutions; the dilated convolution group comprises 3×3 dilated convolutions and 5×5 dilated convolutions; the pooling group comprises 3×3 max pooling and 3×3 average pooling; and the 3×3 separable convolutions, the 5×5 separable convolutions, the 3×3 dilated convolutions, the 5×5 dilated convolutions, the 3×3 max pooling and the 3×3 average pooling are basic components in a neural network.

7. The method according to claim 1, wherein the number of normal cells is 6.

8. The method according to claim 1, wherein the reduction cells are located at a second position and a fifth position of the directed acyclic graph.

* * * * *